(12) United States Patent
Lee et al.

(10) Patent No.: US 8,350,194 B2
(45) Date of Patent: Jan. 8, 2013

(54) COOKING APPARATUS AND HEATING DEVICE INCLUDING WORKING COILS THEREOF

(75) Inventors: Sung Ho Lee, Suwon-si (KR); Seok Weon Hong, Yongin-si (KR); Seong Deog Jang, Suwon-si (KR); Hyang Ki Kim, Suwon-si (KR); Dae Rae Kim, Hwaseong-si (KR); Kil Young Lee, Hwaseong-si (KR); Min Jae Kang, Cheongju-si (KR); Se Min Lee, Suwon-si (KR); Won Sick Jung, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 498 days.

(21) Appl. No.: 12/654,308

(22) Filed: Dec. 16, 2009

(65) Prior Publication Data
US 2010/0176116 A1 Jul. 15, 2010

Related U.S. Application Data

(60) Provisional application No. 61/143,893, filed on Jan. 12, 2009.

(30) Foreign Application Priority Data

May 13, 2009 (KR) ........................ 10-2009-0041816

(51) Int. Cl.
*H05B 3/68* (2006.01)
(52) U.S. Cl. ..................... 219/460.1; 219/622; 219/624; 219/649

(58) Field of Classification Search .......... 219/622–649, 219/460.1
See application file for complete search history.

(56) References Cited

U.S. PATENT DOCUMENTS

| 3,843,857 A | 10/1974 | Cunningham |
| 4,453,067 A | 6/1984 | Karklys et al. |
| 4,770,355 A * | 9/1988 | Mori et al. .................. 242/445.1 |
| 5,866,884 A * | 2/1999 | Cornec et al. ................. 219/622 |
| 2009/0212042 A1* | 8/2009 | Lee et al. ...................... 219/624 |

FOREIGN PATENT DOCUMENTS

| EP | 0 971 562 | 12/2000 |
| FR | 2441988 | 6/1980 |
| GB | 2 048 025 | 12/1980 |
| WO | 98/51128 | 11/1998 |

OTHER PUBLICATIONS

Extended European Search Report for corresponding Application No. 09179541.9-2214 dated Sep. 9, 2010.

* cited by examiner

*Primary Examiner* — Cuong Q Nguyen
(74) *Attorney, Agent, or Firm* — Staas & Halsey LLP (57) ABSTRACT

A cooking apparatus performing cooking with a cooking container disposed at any desired position on a cooking plate, and a heating device thereof. The cooking apparatus includes a cooking plate to receive a cooking container thereon, and at least one working coil disposed under the cooking plate to heat the cooking container, the at least one working coil including a first portion and a second portion having a different winding structure of a conducting wire which forms the working coil so that a winding density of the conducting wire at one of the first portion and the second portion is relatively higher than the other of the first portion and the second portion.

18 Claims, 8 Drawing Sheets

COOKING APPARATUS AND HEATING DEVICE INCLUDING WORKING COILS THEREOF

CROSS-REFERENCE TO RELATED APPLICATIONS

This application claims the benefit of Korean Patent Application No. 2009-0041816 filed on May 13, 2009 in the Korean Intellectual Property Office and U.S. Patent Application No. 61/143,893 filed on Jan. 12, 2009, the disclosures of which are incorporated herein by reference.

BACKGROUND

1. Field

Embodiments of the present invention relate to a cooking apparatus that heats and thereby cooks food.

2. Description of the Related Art

Some cooking apparatuses adopt an induction heating device as a heat source to heat food. The induction heating device heats food using heat generated by eddy current loss and hysteresis loss caused in a cooking container disposed within an alternating magnetic field.

The cooking apparatus adopting the induction heating device includes a cooking plate, and at least one working coil disposed under the cooking plate to inductively heat the cooking container.

Such an induction-type cooking apparatus is very safe because it maintains a relatively low temperature of the cooking plate during cooking and generates almost no toxic gas. Furthermore, the induction-type cooking apparatus achieves high energy efficiency compared to other cooking apparatuses that directly heat coils or employ a gas burner.

Generally, however, the cooking apparatus employing the induction heating device is restricted in use according to the size and position of the working coil. For instance, if a user does not put a cooking container correctly on a cooking area defined by the size and position of the working coil, power consumption is unnecessarily increased, which also increases a stress applied to a power module driving the induction heating device, thereby causing a failure of the cooking apparatus.

SUMMARY

Therefore, it is an aspect of the present embodiment to provide a cooking apparatus performing cooking with a cooking container disposed at any desired position on a cooking plate, and a heating device thereof.

Additional aspects will be set forth in part in the description which follows and, in part, will be obvious from the description, or may be learned by practice of the invention.

The foregoing and/or other aspects are achieved by providing a cooking apparatus including a cooking plate to receive a cooking container thereon, and at least one working coil disposed under the cooking plate to heat the cooking container, the at least one working coil including a first portion and a second portion having a different winding structure of a conducting wire which forms the working coil so that a winding density of the conducting wire at one of the first portion and the second portion is relatively higher at the other of the first portion and the second portion.

The foregoing and/or other aspects are achieved by providing a cooking apparatus, including a cooking plate to receive a cooking container thereon; and a first working coil and a second working coil arranged side by side under the cooking plate to inductively heat the cooking container, the first working coil having a first portion having a higher winding density of a conducting wire than a second portion of the first working coil, and the second working coil having a first portion facing the first portion of the first working coil having the higher winding density and having a higher winding density of a conducting wire than a second portion of the second working coil.

The foregoing and/or other aspects are achieved by providing a heating device for a cooking apparatus, the heating device including a first working coil including a first portion in which a conducting wire forming the first working coil is wound by a plurality of layers and a second portion in which the conducting wire is wound by a smaller number of layers than the first portion; and a second working coil arranged next to the first working coil, and including a first portion in which a conducting wire forming the second working coil is wound by a plurality of layers and a second portion in which the conducting wire is wound by a smaller number of layers than the first portion of the second working coil.

The foregoing and/or other aspects are achieved by providing a cooking apparatus, including: a cooking plate to receive a cooking container thereon; and a heating device disposed beneath the cooking plate and including a first working coil and a second working coil together defining a cooking area, the cooking area including at least a first sub cooking area corresponding to at least one of the first and the second working coils and a second sub cooking area overlapping a portion of each of the first and the second working coils, the second sub cooking area having a greater heating capacity than the first sub cooking area.

The second sub cooking area including a portion of each of the first and second working coils may be heated at a faster rate than the first sub cooking area corresponding to at least one of the first and the second working coils.

BRIEF DESCRIPTION OF THE DRAWINGS

These and/or other aspects of the embodiment will become apparent and more readily appreciated from the following description of the embodiment, taken in conjunction with the accompanying drawings of which.

DETAILED DESCRIPTION OF EMBODIMENT

Reference will now be made in detail to the embodiment, examples of which are illustrated in the accompanying drawings, wherein like reference numerals refer to the like elements throughout.

Figure 1:
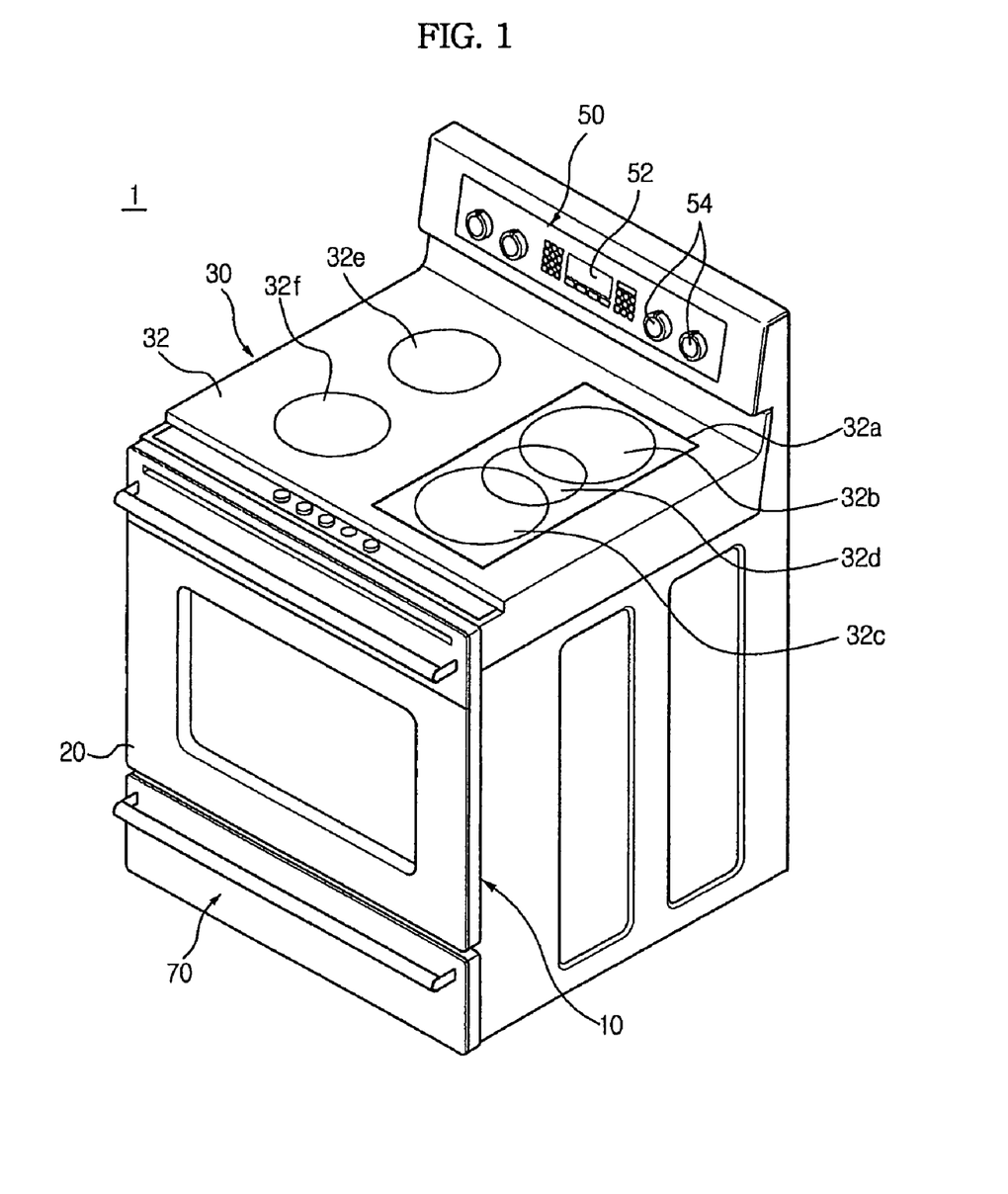
FIG. 1 is a perspective view showing the exterior of a cooking apparatus according to an embodiment.
Figure 2:
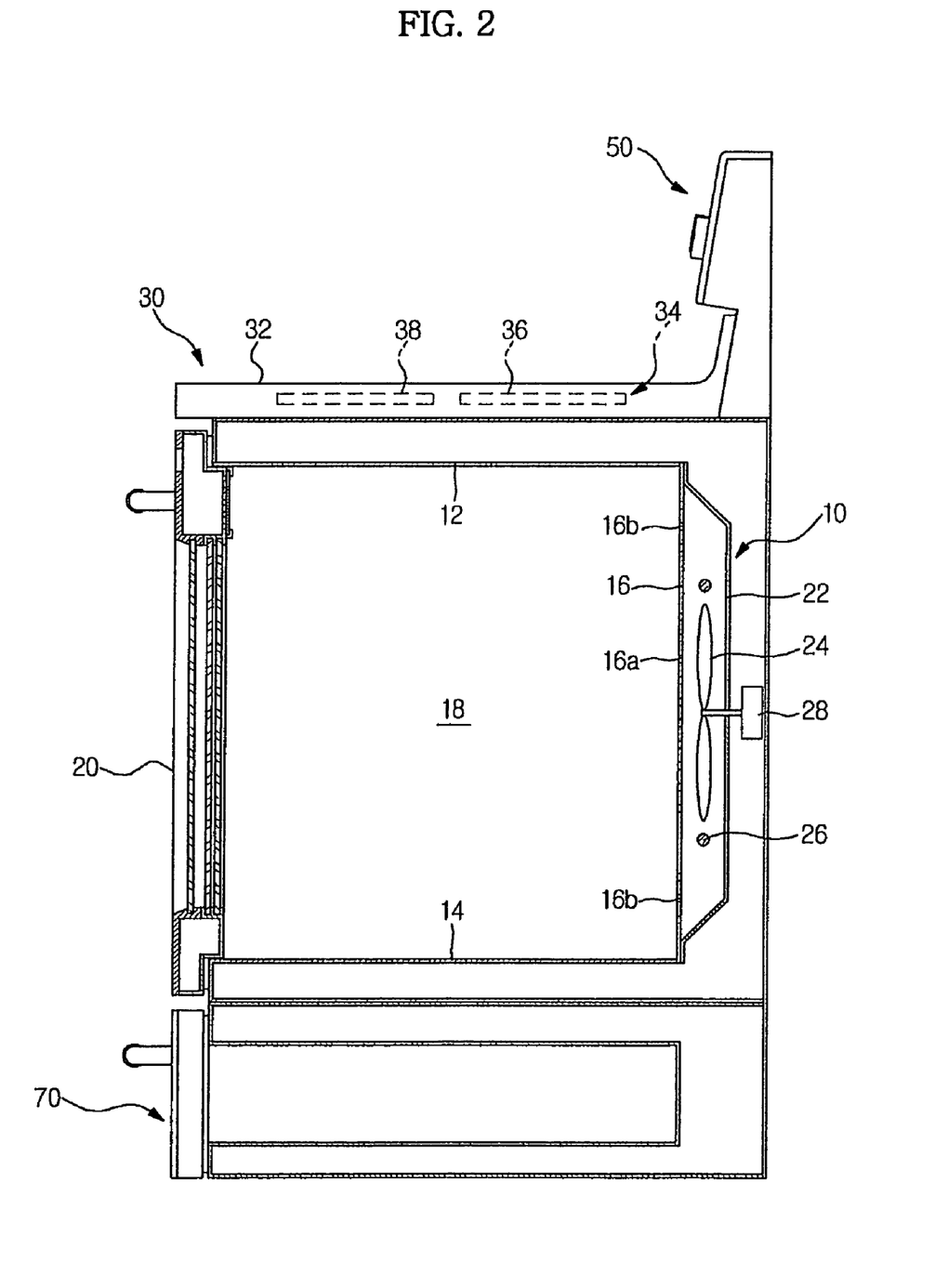
FIG. 2 shows the structure of the cooking apparatus of FIG. 1.

FIG. 1 is a perspective view showing the exterior of a cooking apparatus according to an embodiment and FIG. 2 shows the structure of the cooking apparatus of FIG. 1.

Referring to FIG. 1 and FIG. 2, a cooking apparatus 1 includes an oven 10 heating food in a hermetic space to cook the food, a cook top 30 disposed at an upper part of the oven 10 to cook food with a cooking container put thereon, and a drawer 70 disposed at a lower part of the oven 10 serving as a storage or performing simple cooking.

The oven 10 cooks food using convection of heat, and includes a cooking chamber 18 defined by a top plate 12, a bottom plate 14, both side plates (not shown) and a rear plate 16, and an oven door 20 opening and closing an open front side of the cooking chamber 18.

A fan cover 22 is connected to the outside of the rear plate 16, including a built-in convection fan 24 to circulate air in the cooking chamber 18. A convection heater 26 is mounted near an outer circumference of the convection fan 24. Additionally, a fan motor 28 is mounted at a rear part of the fan cover 22 to drive the convection fan 24.

A plurality of suction holes 16a to draw in the air of the cooking chamber 18 are formed around the center of the rear plate 16 facing the convection fan 24. Also, a plurality of discharge holes 16b are formed at the periphery of the rear plate 16 to supply hot air into the cooking chamber 18 therethrough.

The oven 10 further includes a control panel 50 to control the operations. The control panel 50 includes a display 52 displaying the operational state and operation knobs 54 controlling the operations of the oven 10.

When a user puts food in the cooking chamber 18 and starts the oven 10 through the control panel 50, the convection heater 26 generates heat and the convection fan 24 is rotated by the fan motor 28. Therefore, the air in the cooking chamber 18 is drawn in through the suction holes 16a, heated by the convection heater 26 and then supplied back to the cooking chamber 18 through the discharge holes 16b. The hot air cooks food as circulating in the cooking chamber 18.

The drawer 70 forms a separate cooking space. A dedicated heater may be provided in the drawer 70 to reheat cooked food or perform simple cooking.

Figure 3:
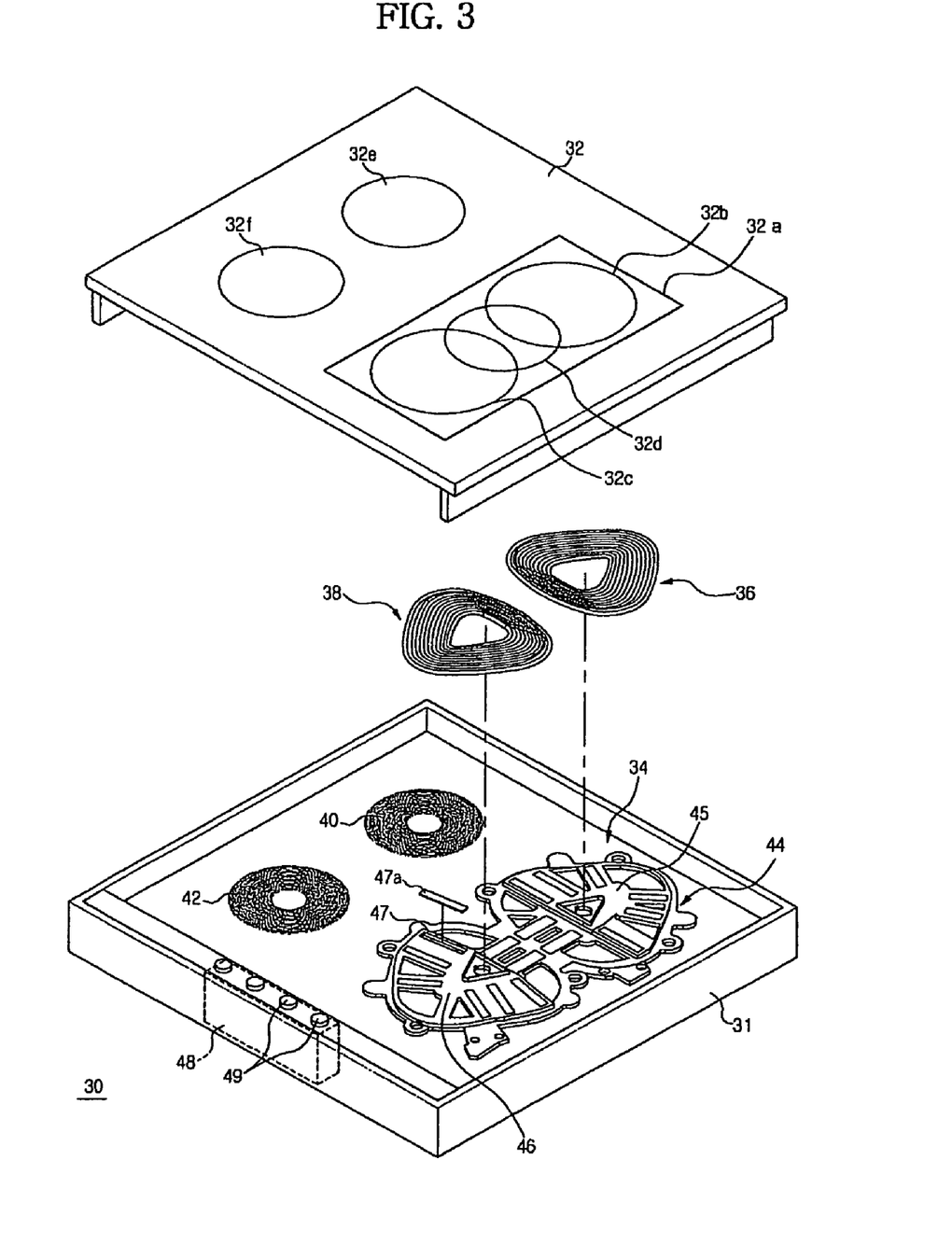
FIG. 3 is a perspective view of a cook top of the cooking apparatus according to the embodiment.
Figure 4:
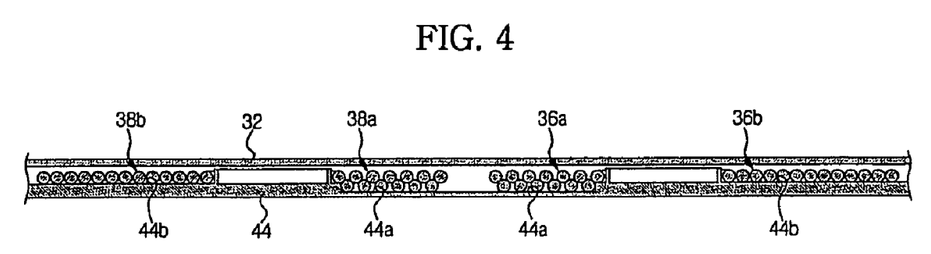
FIG. 4 is a sectional view showing a coil base, first and second working coils, and a cooking plate in the cook top.

FIG. 3 is a perspective view showing a cook top of the cooking apparatus according to the embodiment, and FIG. 4 is a sectional view showing a coil base, first and second working coils, and a cooking plate of the cook top.

As shown in FIG. 3 and FIG. 4, a cook top 30 includes a case 31, a cooking plate 32, a heating device 34 and a control unit 48.

The case 31 receives various parts and electric components including the heating device 34 and the control unit 48 which constitute the cook top 30.

The cooking plate 32 is disposed at an upper part of the case 31 in a flat form to receive a cooking container thereon. The cooking plate 32 may be formed using tempered glass so as not to be easily broken or scratched.

The heating device 34 is mounted at a lower part of the cooking plate 32 to heat a cooking container placed on the cooking plate 32. The heating device 34 includes at least one working coil, for example first to fourth working coils 36, 38, 40 and 42 as shown in the drawing. Upon application of a voltage, the working coils 36, 38, 40 and 42 generate an alternating magnetic field which applies heat to the cooking container placed on the cooking plate 32.

The first working coil 36 and the second working coil 38 are arranged side by side, thereby defining a first cooking area 32a on the cooking plate 32. The first cooking area 32a may be divided into a first sub cooking area 32b corresponding to the first working coil 36, a second sub cooking area 32c corresponding to the second working coil 38, and a third sub cooking area 32d partly overlapping both of the first and the second working coils 36 and 38.

The third working coil 40 and the fourth working coil 42 define a second cooking area 32e and a third cooking area 32f, respectively, on the cooking plate 32. However, the embodiment is suggested only as an example, but not limited, to include the third working coil 40, the fourth working coil 42, the second cooking area 32e and the third cooking area 32f as shown in FIG. 3 and FIG. 4.

The control unit 48 controls the operations of the cook top 30. The control unit 48 includes an operation unit 49 for a user to input operational commands about the cooking, and controls the first to the fourth working coils 36, 38, 40 and 42 in accordance with the commands input through the operation unit 49.

Through the operation unit 49, the user may operate the first working coil 36 and the second working coil 38 simultaneously or separately, as necessary. In addition, the user may operate the third and the fourth working coils 40 and 42 through the operation unit 49.

The user may choose a proper one of the cooking areas considering the size and the shape of a cooking container. The cooking will be efficiently performed when the cooking container is disposed correctly on the chosen cooking area.

Figure 7A:
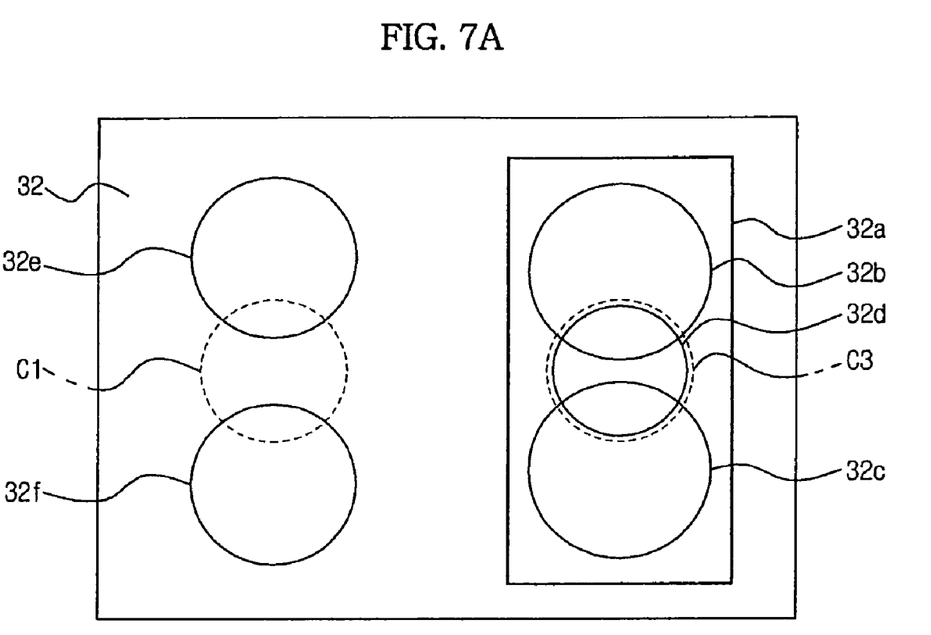
FIGS. 7A and 7B are views showing states in which various sizes of cooking containers are put on the cooking plate of the cooking apparatus according to the embodiment.

For instance, as shown in FIG. 7A, if one of the third and the fourth working coils 40 and 42 is operated in a state where a relatively small cooking container C1 is placed between the second cooking area 32e and the third cooking area 32f, cooking will not be effectively performed. Furthermore, a power supply module which operates the third or fourth working coil 40 or 42 may even be damaged.

Figure 7B:
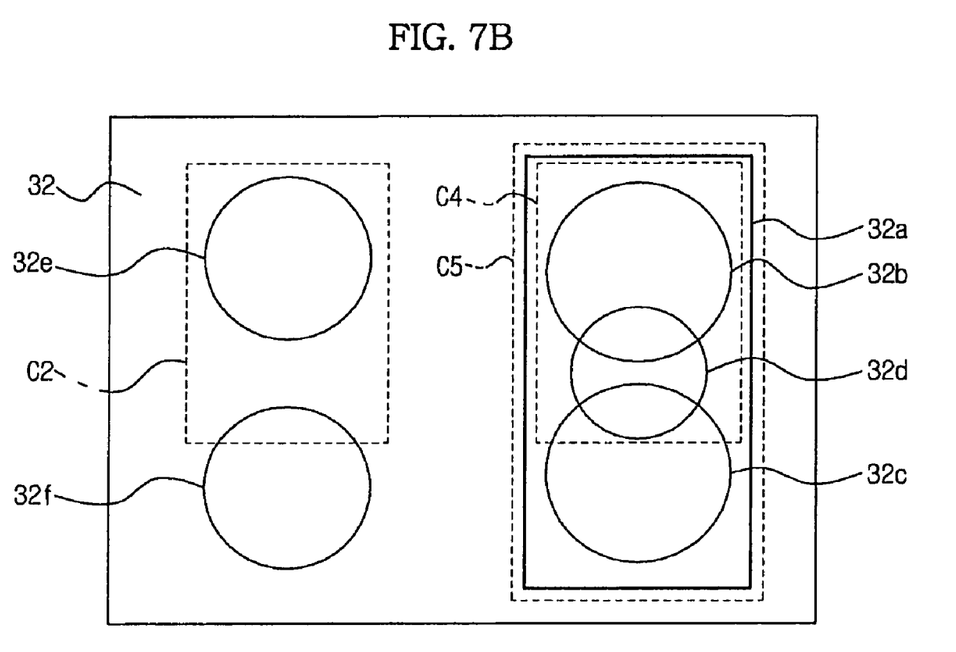

Although the third working coil 40 is operated after a cooking container C2 having another size or form is disposed correctly on the second cooking area 32e as shown in FIG. 7B, if the cooking container C2 is wider than the second cooking area 32e and therefore also occupies part of the third cooking area 32f, a certain part of the cooking container C2 is not applied with a magnetic field of the fourth working coil 42. Therefore, cooking efficiency is deteriorated. If the fourth working coil 42 is additionally operated to hasten the cooking, the power supply module which operates the fourth working coil 42 may be damaged.

Figure 5:
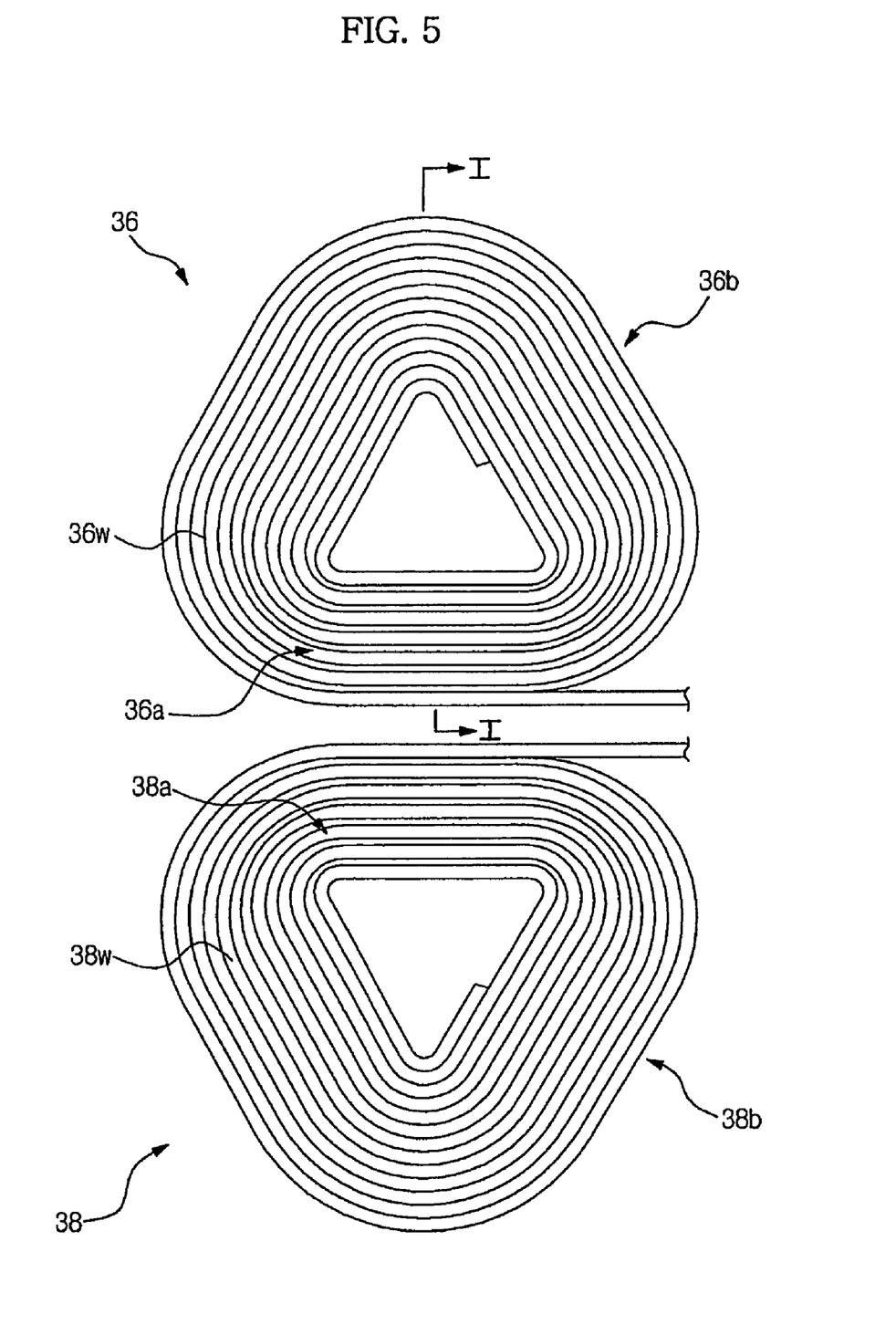
FIG. 5 is a plan view showing the first working coil and the second working coil in a heating device of the cooking apparatus according to the embodiment.
Figure 6:
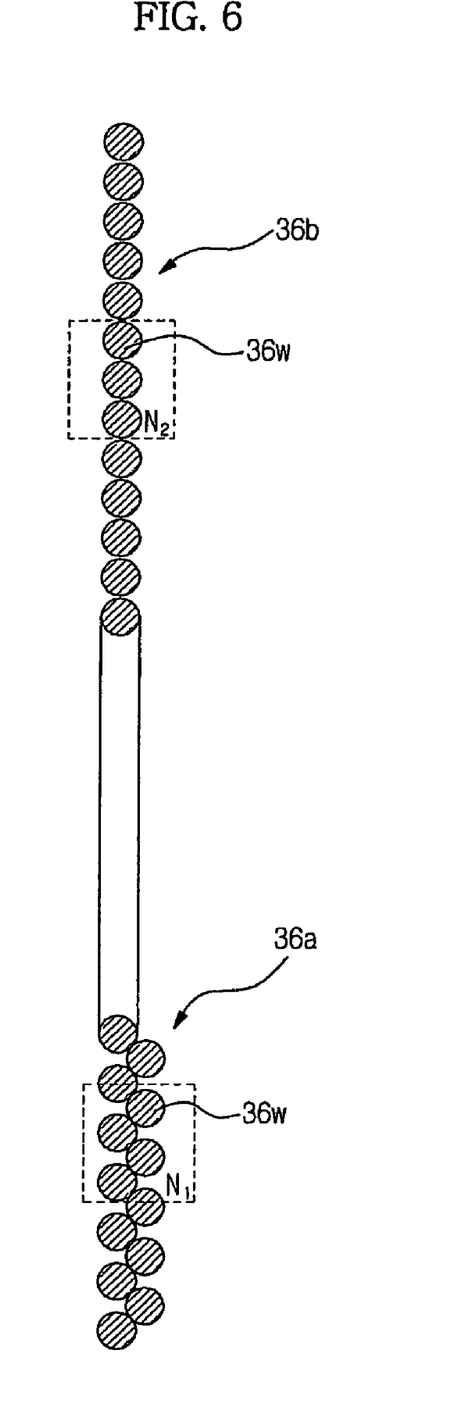
FIG. 6 is a sectional view of FIG. 5, cut along a line I-I.

FIG. 5 is a plan view showing the first working coil and the second working coil in a heating device of the cooking apparatus according to the embodiment. FIG. 6 is a sectional view of FIG. 5, cut along a line I-I.

Referring to FIG. 5 and FIG. 6, the working coils 36 and 38 are respectively divided into first portions 36a and 38a and second portions 36b and 38b having a different winding structure of conducting wires 36W and 38W which form the working coils 36 and 38 so that a winding density of the conducting wires 36W and 38W becomes relatively high at a predetermined portion.

More specifically, in the first working coil 36, the first portion 36a has a higher winding density of the conducting wire 36W than the second portion 36b. In the same manner, in the second working coil 38, the first portion 38a has a higher winding density of the conducting wire 38W than the second portion 38b. Here, the first portion 38a of the second working coil 38 may be disposed to face the first portion 36a of the first working coil 36. According to such configuration, certain portions of the first and the second working coils 36 and 38 may have greater reactance than other portions. Therefore, a variety size of cooking containers can be used by being freely disposed at desired positions.

For example, the user may put a cooking container on the first sub cooking area 32b or the second sub cooking area 32c and perform cooking by operating the first working coil 36 or the second working coil 38.

For another example, when a cooking container C3 having a relatively small size is placed on a position only partly overlapping the first and the second sub cooking areas 32b and 32c as shown in FIG. 7A, the first and the second working coils 36 and 38 may both be operated to perform cooking. Furthermore, as shown in FIG. 7B, when a cooking container C4 having a greater size than the first sub cooking area 32b is put on the first sub cooking area 32b and further on the third sub cooking area 32d, cooking may be performed by operating both of the first and the second working coils 36 and 38. Here, since the conducting wires 36W and 38W of the first portions 36a and 38a of the first and second working coils 36 and 38 are arranged having a relatively higher density, the cooking container disposed on the third cooking area 32d can be quickly heated while preventing damage of the power module that operates the first and the second working coils 36 and 38.

Also, as shown in FIG. 7B, if a cooking container C5 having a large size covering the whole first cooking area 32a is disposed on the first cooking area 32a, the first and the second working coils 36 and 38 may both be operated. According to this embodiment, since the conducting wires 36W and 38W are densely arranged in the first portions 36a and 38a, facing each other, of the first and the second working coils 36 and 38, the cooking container C5 may be effectively heated at the center thereof. As a consequence, the cooking efficiency may be improved.

The first and the second portions 36a and 36b of the first working coil 36 may have a different number of layers of the conducting wire 36W forming the first working coil 36. Specifically, the first portion 36a of the first working coil 36 may include a plurality of layers of the conducting wire 36W as shown in FIG. 6, while the second portion 36b of the first working coil 36 may include a single layer of the conducting wire 36W. Here, the first working coil 36 may be constituted by a single strand of the conducting wire 36W.

According to an embodiment, the number of winding turns N1 of the first working coil 36 in a unit area of the first portion 36a and the number of winding turns N2 in a unit area of the second portion 36b may satisfy (Expression 1) as follows:

$$1.3N2 \leq N1 \leq 3N2 \quad \text{(Expression 1)}$$

If it satisfies the relationships of $N2 \leq N1 \leq 1.3N2$, the effect of the concentrative arrangement of the conducting wire 36W on the first portion 36a of the first working coil 36 may not be obviously shown. On the other hand, when it satisfies N1>3N2, installation of the first working coil 36a is structurally restricted as the thickness of the first portion 36a is increased. Also, the cooking area corresponding to the first portion 36a of the first working coil 36 is reduced too much.

The above description about the first working coil 36 is applied to the second working coil 38 as well. That is, the first and the second portions 38a and 38b of the second working coil 38 may have a different number of layers of the conducting wire 38W forming the second working coil 38. For example, the first portion 38a of the second working coil 38 may include a plurality of layers of the conducting wire 38W.

Although the first and the second portions 36a and 36b of the first working coil 36 are wound in different forms, it is exemplary that an upper surface of the first portion 36a and an upper surface of the second portion 36b are arranged substantially on the same plane as shown in FIG. 4. In addition, it is exemplary that upper surfaces of the first and the second portions 38a and 38b of the second working coil 38 are arranged substantially on the same plane. Accordingly, the first and the second working coils 36 and 38 may be disposed as near as possible to the cooking plate 32.

Referring again to FIG. 3 and FIG. 4, the heating device 34 includes a coil base 44 supporting the first and the second working coils 36 and 38, which is disposed at a lower part of the working coils 36 and 38.

The coil base 44 includes a first seating part 45 seating the first working coil 36 and a second seating part 46 seating the second working coil 38. A plurality of mounting recesses 47 may be formed through the first and the second seating parts 45 and 46. A ferrite 47a may be mounted in the mounting recesses 47 in order to increase density of the magnetic field generated by the first and the second working coils 36 and 38.

The coil base 44 further includes a first supporting surface 44a corresponding to the first portions 36a and 38a of the coils 36 and 38, and a second supporting surface 44b corresponding to the second portions 36b and 38b of the coils 36 and 38. The first supporting surface 44a is stepped down from the second supporting surface 44b, thereby securing a space for the plurality of layers of the conducting wires. Accordingly, the upper surfaces of the first working coil 36 and the second working coil 38 can be coplanarly arranged.

Although the explained embodiment is configured in a manner that the first and the second working coils 36 and 38 respectively have the first portions 36a and 38a and the second portions 36b and 38b having different winding structures of the conducting wires, only one of the first and the second working coils 36 and 38 may be configured to have the first and second portions separately.

In addition, although the embodiment has been explained with reference to the cooking apparatus equipped with the cook top, the oven and the drawer, the aspect of the present invention is not limited to the embodiment but may be applied to a cooking apparatus only including the cook top.

As is apparent from the above description, a cooking apparatus and a heating device thereof according to the embodiment may improve user convenience since a variety size of cooking containers are usable as disposed at any positions as desired.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A cooking apparatus, comprising:
   a cooking plate to receive a cooking container thereon; and
   at least one working coil disposed under the cooking plate to heat the cooking container, the at least one working coil including a first working coil and a second working coil, at least one of the first and the second working coils including a first portion and a second portion, a winding density of the first portion is relatively higher than a winding density of the second portion,
   wherein the first and the second working coils define a cooking area, and
   wherein the cooking area is divided into a first sub cooking area corresponding to the first working coil, a second sub cooking area corresponding to the second working coil, and a third sub cooking area having the first portion of the at least one of the first and the second working coils.

2. The cooking apparatus according to claim 1, wherein the first portion of the at least one working coil has a different number of layers of the conducting wire than the second portion of the at least one working coil.

3. The cooking apparatus according to claim 1, wherein the first portion of the at least one working coil includes a plurality of layers of the conducting wire.

4. The cooking apparatus according to claim 1, wherein an expression of $1.3N2 \leqq N1 \leqq 3N2$ is satisfied, where N1 is a number of winding turns of the at least one working coil in a unit area of the first portion and N2 is a number of winding turns of the at least one working coil in a unit area of the second portion.

5. The cooking apparatus according to claim 1, wherein the first portion of the at least one working coil has greater reactance than the second portion of the at least one working coil.

6. The cooking apparatus according to claim 1, wherein an upper surface of the first portion and an upper surface of the second portion of the at least one working coil are disposed substantially on a same plane.

7. The cooking apparatus according to claim 1, further comprising a coil base disposed at a lower part of the at least one working coil including a first supporting surface and a second supporting surface respectively corresponding to the first portion and the second portion of the at least one working coil, the first supporting surface being stepped with respect to the second supporting surface.

8. The cooking apparatus according to claim 1, wherein the first and the second working coils each include the first portion and the second portion, the first portion having a relatively higher winding density of the conducting wire forming the respective working coils than the second portion, the first portion of the first working coil and the first portion of the second working coil facing each other.

9. The cooking apparatus according to claim 8, wherein the cooking plate includes a cooking area defined by the first portion of the first working coil and the first portion of the second working coil.

10. The cooking apparatus according to claim 1, wherein the first portion and the second portion of the at least one working coil include a single strand of the conducting wire.

11. A cooking apparatus, comprising:
a cooking plate to receive a cooking container thereon; and
a first working coil and a second working coil arranged side by side under the cooking plate to inductively heat the cooking container, the first working coil having a first portion having a higher winding density of a conducting wire than a second portion of the first working coil, and the second working coil having a first portion facing the first portion of the first working coil having the higher winding density and having a higher winding density of a conducting wire than a second portion of the second working coil,
wherein the first and the second working coils define a cooking area, and
wherein the cooking area is divided into a first sub cooking area corresponding to the first working coil, a second sub cooking area corresponding to the second working coil, and a third sub cooking area having the first portion of the at least one of the first and the second working coils.

12. A heating device for a cooking apparatus, the heating device comprising:
a first working coil including a first portion in which a conducting wire forming the first working coil is wound by a plurality of layers and a second portion in which the conducting wire is wound by a smaller number of layers than the first portion; and
a second working coil arranged next to the first working coil, and including a first portion in which a conducting wire forming the second working coil is wound by a plurality of layers and a second portion in which the conducting wire is wound by a smaller number of layers than the first portion of the second working coil,
wherein the first and the second working coils define a cooking area, and
wherein the cooking area is divided into a first sub cooking area corresponding to the first working coil, a second sub cooking area corresponding to the second working coil, and a third sub cooking area having the first portion of the at least one of the first and the second working coils.

13. The heating device according to claim 12, wherein the first portion of the first working coil and the first portion of the second working coil are arranged to face each other.

14. The heating device according to claim 12, wherein the first portions of the first working coil and the second working coil have greater reactance than the second portions of the first and the second working coils.

15. The heating device according to claim 12, wherein an upper surface of the first working coil and an upper surface of the second working coil are arranged substantially on a same plane.

16. The heating device according to claim 15, further comprising a coil base supporting both the first and the second working coils, the coil base including a first supporting surface corresponding to the first portions of the first working coil and the second working coil and a second supporting surface corresponding to the second portions of the first working coil and the second working coil, the first supporting surface of the coil base being stepped downward from the second supporting surface of the coil base.

17. A cooking apparatus, comprising:
a cooking plate to receive a cooking container thereon; and
a heating device disposed beneath the cooking plate and including a first working coil and a second working coil together defining a cooking area, the cooking area including first sub cooking area corresponding to of the first coil, a second sub cooking area corresponding to the second working coil, and a third sub cooking area overlapping the first portion of each of the first and the second working coils, the third sub cooking area having a greater heating capacity than the first and the second sub cooking areas.

18. The cooking apparatus according to claim 17, wherein the third sub cooking area is heated at a faster rate than the first and the second sub cooking areas.

* * * * *

UNITED STATES PATENT AND TRADEMARK OFFICE
CERTIFICATE OF CORRECTION

PATENT NO. : 8,350,194 B2
APPLICATION NO. : 12/654308
DATED : January 8, 2013
INVENTOR(S) : Sung Ho Lee et al.

It is certified that error appears in the above-identified patent and that said Letters Patent is hereby corrected as shown below:

In the Claims

Column 8, Line 46, In Claim 17, after "including" insert -- a --.
Column 8, Line 46, In Claim 17, after "to" delete "of".

Signed and Sealed this
Seventh Day of May, 2013

Teresa Stanek Rea
*Acting Director of the United States Patent and Trademark Office*